US007747270B2

(12) United States Patent
Schwagmann et al.

(10) Patent No.: US 7,747,270 B2
(45) Date of Patent: Jun. 29, 2010

(54) METHOD FOR ALLOCATING A COMMUNICATION RIGHT, COMMUNICATION CONFERENCE SESSION SERVER AND COMMUNICATION CONFERENCE SESSION SERVER ARRANGEMENT

(75) Inventors: Norbert Schwagmann, Lehe (DE); Andreas Schmidt, Braunschweig (DE); Holger Schmidt, Braunschweig (DE); Achim Luft, Braunschweig (DE)

(73) Assignee: Infineon Technologies AG, Neubiberg (DE)

( * ) Notice: Subject to any disclaimer, the term of this patent is extended or adjusted under 35 U.S.C. 154(b) by 851 days.

(21) Appl. No.: 11/463,373

(22) Filed: Aug. 9, 2006

(65) Prior Publication Data

US 2007/0058573 A1 Mar. 15, 2007

(30) Foreign Application Priority Data

Aug. 9, 2005 (DE) ................. 10 2005 037 569

(51) Int. Cl.
*H04B 7/00* (2006.01)
(52) U.S. Cl. .................... 455/519; 370/266; 370/447
(58) Field of Classification Search .............. 455/519
See application file for complete search history.

(56) References Cited

U.S. PATENT DOCUMENTS

| | | | | |
|---|---|---|---|---|
| 3,676,846 A | * | 7/1972 | Busch | 714/749 |
| 5,115,233 A | * | 5/1992 | Zdunek et al. | 370/348 |
| 5,448,620 A | * | 9/1995 | Gershkovich et al. | 455/552.1 |
| 6,023,626 A | * | 2/2000 | Kinnunen et al. | 455/512 |
| 6,072,994 A | * | 6/2000 | Phillips et al. | 455/84 |
| 6,233,248 B1 | * | 5/2001 | Sautter et al. | 370/465 |
| 6,366,782 B1 | * | 4/2002 | Fumarolo et al. | 455/457 |
| 6,477,150 B1 | * | 11/2002 | Maggenti et al. | 370/312 |
| 6,711,398 B1 | * | 3/2004 | Talaie et al. | 455/403 |
| 6,850,497 B1 | * | 2/2005 | Sigler et al. | 370/310 |
| 6,873,854 B2 | * | 3/2005 | Crockett et al. | 455/518 |
| 6,912,397 B2 | * | 6/2005 | Liou | 455/456.1 |
| 6,952,592 B2 | * | 10/2005 | Dorenbosch | 455/518 |
| 6,999,783 B2 | * | 2/2006 | Toyryla et al. | 455/519 |
| 7,026,926 B1 | * | 4/2006 | Walker, III | 340/539.11 |
| 7,031,309 B1 | * | 4/2006 | Sautter et al. | 370/392 |
| 7,069,031 B2 | * | 6/2006 | Maggenti et al. | 455/517 |
| 7,170,863 B1 | * | 1/2007 | Denman et al. | 370/260 |

(Continued)

FOREIGN PATENT DOCUMENTS

EP 0 579 305 A2 1/1994

(Continued)

OTHER PUBLICATIONS

Push-to-Talk over Cellular (PoC); Architecture; PoC-Release 1.0, Architecture V1.1.0—Technical Specification, pp. 1-23 (Aug. 2003).

(Continued)

*Primary Examiner*—Duc Nguyen
*Assistant Examiner*—Hai V Nguyen
(74) *Attorney, Agent, or Firm*—Dickstein, Shapiro, LLP.

(57) ABSTRACT

A plurality of communication conference sessions coupled to one another such that when a communication right is requested, a check is made to ascertain whether the communication right has already been allotted to subscribers in a different, coupled communication conference session. In such a case, the communication right is denied, and otherwise, the communication right is granted.

18 Claims, 6 Drawing Sheets

U.S. PATENT DOCUMENTS

| | | | |
|---|---|---|---|
| 7,184,790 B2* | 2/2007 | Dorenbosch et al. | 455/519 |
| 7,203,509 B2* | 4/2007 | Gottschalk et al. | 455/518 |
| 7,280,502 B2* | 10/2007 | Allen et al. | 370/329 |
| 7,394,798 B2* | 7/2008 | Naghian | 370/338 |
| 7,408,890 B1* | 8/2008 | Doran et al. | 370/261 |
| 7,415,282 B2* | 8/2008 | Tillet et al. | 455/509 |
| 7,427,024 B1* | 9/2008 | Gazdzinski et al. | 235/384 |
| 7,433,716 B2* | 10/2008 | Denton | 455/569.1 |
| 7,522,584 B2* | 4/2009 | Kautz et al. | 370/354 |
| 7,570,966 B2* | 8/2009 | Zhao et al. | 455/518 |
| 7,653,405 B2* | 1/2010 | Wu et al. | 455/519 |
| 2002/0061760 A1* | 5/2002 | Maggenti et al. | 455/518 |
| 2002/0077136 A1* | 6/2002 | Maggenti et al. | 455/518 |
| 2003/0012149 A1* | 1/2003 | Maggenti et al. | 370/260 |
| 2003/0083086 A1* | 5/2003 | Toyryla et al. | 455/518 |
| 2003/0235184 A1* | 12/2003 | Dorenbosch et al. | 370/352 |
| 2004/0072586 A1* | 4/2004 | Dorenbosch | 455/507 |
| 2004/0127233 A1 | 7/2004 | Harris et al. | |
| 2004/0164894 A1* | 8/2004 | Liou | 342/357.1 |
| 2004/0224678 A1* | 11/2004 | Dahod et al. | 455/426.1 |
| 2004/0228292 A1* | 11/2004 | Edwards | 370/277 |
| 2005/0026598 A1* | 2/2005 | Patel et al. | 455/412.2 |
| 2005/0037777 A1* | 2/2005 | Liou | 455/456.2 |
| 2005/0128997 A1* | 6/2005 | Zhao et al. | 370/349 |
| 2005/0131989 A1* | 6/2005 | Beckmann et al. | 709/201 |
| 2005/0149333 A1* | 7/2005 | Thalanany et al. | 704/275 |
| 2005/0180394 A1* | 8/2005 | Kautz et al. | 370/352 |
| 2005/0190740 A1* | 9/2005 | Zhao et al. | 370/349 |
| 2005/0197146 A1* | 9/2005 | Rao et al. | 455/519 |
| 2005/0249153 A1* | 11/2005 | Park et al. | 370/328 |
| 2005/0255860 A1* | 11/2005 | Liou | 455/456.1 |
| 2005/0288039 A1* | 12/2005 | Liou | 455/456.6 |
| 2006/0002328 A1* | 1/2006 | Naghian | 370/328 |
| 2006/0003747 A1* | 1/2006 | Kolakowski | 455/414.1 |
| 2006/0014498 A1* | 1/2006 | Yau et al. | 455/90.2 |
| 2006/0019655 A1* | 1/2006 | Peacock | 455/426.1 |
| 2006/0023649 A1* | 2/2006 | Tillet et al. | 370/310 |
| 2006/0025165 A1* | 2/2006 | Tillet et al. | 455/517 |
| 2006/0030344 A1* | 2/2006 | Lim | 455/512 |
| 2006/0035656 A1* | 2/2006 | Sung et al. | 455/518 |
| 2006/0035657 A1* | 2/2006 | Lim | 455/518 |
| 2006/0040683 A1* | 2/2006 | Lappalainen et al. | 455/466 |
| 2006/0046697 A1* | 3/2006 | Koren et al. | 455/412.2 |
| 2006/0047820 A1* | 3/2006 | Sung et al. | 709/227 |
| 2006/0058052 A1* | 3/2006 | Plestid et al. | 455/519 |
| 2006/0059199 A1* | 3/2006 | Lappalainen et al. | 707/104.1 |
| 2006/0063553 A1* | 3/2006 | Iyer et al. | 455/519 |
| 2006/0073843 A1* | 4/2006 | Aerrabotu et al. | 455/519 |
| 2006/0080407 A1* | 4/2006 | Rengaraju | 709/219 |
| 2006/0084454 A1* | 4/2006 | Sung et al. | 455/518 |
| 2006/0116149 A1* | 6/2006 | Dunn et al. | 455/518 |
| 2006/0142036 A1* | 6/2006 | Lim | 455/518 |
| 2006/0199594 A1* | 9/2006 | Gundu | 455/452.2 |
| 2006/0205426 A1* | 9/2006 | Denton | 455/518 |
| 2006/0276213 A1* | 12/2006 | Gottschalk et al. | 455/518 |
| 2007/0016828 A1* | 1/2007 | Luo et al. | 714/38 |
| 2007/0019595 A1* | 1/2007 | Huh et al. | 370/338 |
| 2007/0021133 A1* | 1/2007 | Coulas | 455/518 |
| 2007/0021136 A1* | 1/2007 | Allen | 455/518 |
| 2007/0173273 A1* | 7/2007 | Gogic | 455/518 |
| 2007/0208809 A1* | 9/2007 | Westman | 709/205 |
| 2007/0249381 A1* | 10/2007 | Forslow | 455/517 |
| 2008/0261564 A1* | 10/2008 | Logan | 455/413 |
| 2008/0273487 A1* | 11/2008 | Naghian | 370/328 |
| 2009/0131092 A1* | 5/2009 | Kaida | 455/518 |
| 2009/0176461 A1* | 7/2009 | Kautz et al. | 455/90.2 |

FOREIGN PATENT DOCUMENTS

| | | |
|---|---|---|
| EP | 1 569 473 A1 | 8/2005 |
| WO | WO 2005/062569 A1 | 7/2005 |

OTHER PUBLICATIONS

Rosenberg et al., Network Working Group, Request for Comments: 3261, SIP: Session Initiation Protocol, pp. 1-269 (Jun. 2002).

Camarillo et al., XCON Working Group, The Binary Floor Control Protocol (BFCP), draft-ietf-xcon-bfcp-03.txt, pp. 1-57 (Dec. 31, 2004).

J. Rosenberg, SIP Internet-Draft, A Framework for Conferencing with the Session Initiation Protocol, draft-ietf-sipping-conferencing-framework-01, pp. 1-51 (Oct. 27, 2003).

* cited by examiner

METHOD FOR ALLOCATING A COMMUNICATION RIGHT, COMMUNICATION CONFERENCE SESSION SERVER AND COMMUNICATION CONFERENCE SESSION SERVER ARRANGEMENT

CROSS-REFERENCE TO RELATED APPLICATION

This application claims priority to German Patent Application Serial No. 10 2005 037 569.3-42, which was filed on Aug. 9, 2005, and is incorporated herein by reference in its entirety.

TECHNICAL FIELD

The invention relates to a method for allocating a communication right, to a communication conference session server, and to a communication conference session server arrangement.

BACKGROUND OF THE INVENTION

In the context of a telecommunication conference, for example in a telecommunication conference in the context of a push-to-talk-over-cellular communication system (PoC communication system), for a PoC user who has logged on to a plurality of POC sessions simultaneously and plays an important part in each of them (for example a construction company manager who has a respective PoC session with each construction site), it is often desirable to prevent the PoC user from missing any voice message in the plurality of PoC sessions.

DETAILED DESCRIPTION

Figure 1:
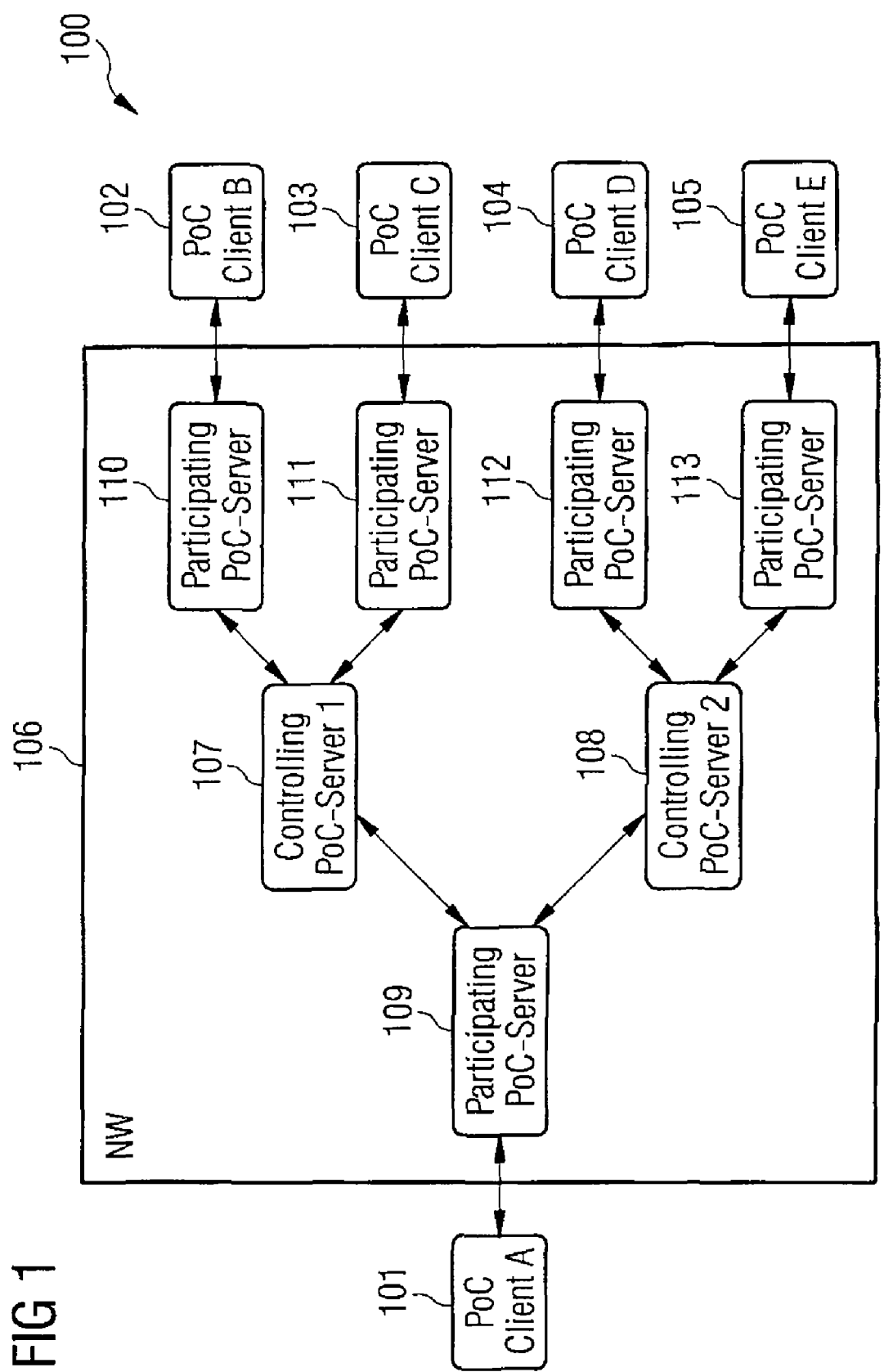
FIG. 1 shows a block diagram illustrating a push-to-talk-over-cellular communication system in accordance with exemplary embodiments of the invention.

In the context of a conventional PoC communication system it can happen that a user participating in a plurality of PoC sessions misses voice messages if voice messages arise simultaneously in the PoC sessions.

The following situation is considered by way of example:

A PoC user has logged on to a plurality (hereinafter two generally any desired number) of PoC sessions simultaneously.

Voice messages arise simultaneously in at least two (hereinafter therefore in both) PoC sessions.

Since push-to-talk-over-cellular (PoC) is a real-time voice service, PoC has been specified in a practical manner such that at one point in time a PoC user can also only ever receive voice messages with respect to one PoC session. This means in the scenario assumed above, therefore, that the PoC user is sent only one of the two voice messages.

Consequently, it is a fundamental disadvantage of PoC at present that the PoC user misses the corresponding other voice message and is not presented with it.

The PoC specification provides a mechanism for this which, in such a case, at least gives a PoC user the option of choosing which PoC session he monitors at all events. For this purpose, he can select one PoC session as the "primary" PoC session. By way of example, it is provided that for the primary session the voice messages are always presented to the user, and the voice messages of the "secondary" PoC session, for the case where a voice message is simultaneously present in the primary session, are not directed to the PoC user and, consequently, are not presented to said user either.

Thus, voice messages are potentially lost to a PoC user.

A mechanism by which a PoC user who has logged on to a plurality of PoC sessions simultaneously never misses a voice message has not been known heretofore.

In accordance with one exemplary embodiment of the invention, in a plurality of communication conferences in which at least one subscriber jointly participates, it is ensured that the subscriber is presented with all the voice messages of both communication conferences.

In accordance with one exemplary embodiment of the invention, a method for allocating a communication right in a first communication conference session is provided, comprising determining, after a communication right has been requested by a first subscriber in the first communication conference session, whether a communication right has been granted to a different subscriber in a second communication conference session between a second plurality of subscribers, at least one second subscriber of the plurality of subscribers in the first communication conference session also being subscriber(s) in the second communication conference session, the second subscriber participating in the first communication conference session and in the second communication conference session by means of a subscriber server assigned to said second subscriber, and the process of determining whether a communication right has been granted to a different subscriber in the second communication conference session being carried out by the subscriber server assigned to the second subscriber. The first subscriber is denied the requested communication right for the case where a communication right has been granted to a subscriber in the second communication conference session. The first subscriber is granted the requested communication right for the case where a communication right has not been granted to any subscriber in the second communication conference session.

In accordance with one exemplary embodiment of the invention, in a method for allocating a communication right in a first communication conference session between a first plurality of subscribers, a subscriber being granted by a communication right in a communication conference session the right to introduce communication data into the communication conference session, after a communication right has been requested by a subscriber in the first communication conference session, a process of determining whether a communication right has been granted to a different subscriber in a second communication conference session between a second plurality of subscribers is effected, at least one subscriber of the plurality of subscribers in the first communication conference session also being subscriber(s) in the second communication conference session. For the case where a communication right has been granted to a subscriber in the second communication conference session, the subscriber in the first communication conference session is denied the requested communication right. For the case where a communication right has not been granted to any subscriber in the second communication conference session, the subscriber in the first communication conference session is granted the requested communication right.

In accordance with one exemplary embodiment of the invention, a communication conference session server is provided, which provides a first communication conference between a first plurality of subscribers and a second communication conference session between a second plurality of subscribers, at least one subscriber of the plurality of subscribers in the first communication conference session also being subscriber(s) in the second communication conference session. The communication conference session server has a communication right allocation unit, which allocates a communication right, a communication right granting a subscriber in a communication conference session the right to introduce communication data into the communication conference session. Furthermore, provision is made of a communication right determining unit, which after receiving a request from a subscriber in the first communication conference session for granting a communication right determines whether a communication right has been granted to a different subscriber in the second communication conference session, for the case where a communication right has been granted to a subscriber in the second communication conference session, denies the subscriber in the first communication conference session the requested communication right and for the case where a communication right has not been granted to any subscriber in the second communication conference session, grants the subscriber in the first communication conference session the requested communication right.

A communication conference session server arrangement has a communication conference session server, which provides and controls a first communication conference session between a first plurality of subscribers, and a second communication conference session server, which provides and controls a second communication conference session between a second plurality of subscribers, at least one subscriber of the plurality of subscribers in the first communication conference session also being subscriber(s) in the second communication conference session. Furthermore, a third communication conference session server is provided, for example as described above, which is coupled to the first communication conference session server and to the second communication conference session server. The first communication conference session server, upon receiving a request from a subscriber in the first communication conference session for granting a communication right, forwards the request to the third communication conference session server and grants the communication right to the subscriber only if the first communication conference session server receives a corresponding release on the part of the third communication conference session server.

In accordance with one exemplary embodiment of the invention, the communication right allocation, for example the talk right allocation, is coupled to one another in a plurality of parallel communication conference sessions.

In accordance with one exemplary embodiment of the invention, it is ensured for the first time for a subscriber in a plurality of communication conference sessions that the subscriber does not miss any voice messages from other subscribers even if other subscribers request the respective communication right in both communication conference sessions simultaneously.

Exemplary embodiments of the invention emerge from the dependent claims. The configurations of the invention which are described below relate, insofar as is expedient, to the method for allocating the communication right and to the communication conference session server and also to the communication conference session server arrangement.

The first communication conference session and/or the second communication conference session may be a half-duplex conference session(s), for example push-to-talk communication conference session(s) and in this case for example push-to-talk-over-cellular communication conference session(s) (PoC communication conference session(s), PoC session(s)).

The invention is especially suitable in the case where a communication right can be allocated explicitly only to one respective subscriber in a communication conference and the other subscribers in the communication conference can only receive the communication data introduced in accordance with the communication right of the communication conference session (half-duplex communication conference session), and in the case of a plurality of such communication conference sessions which are set up simultaneously and in the case of which one subscriber has logged on to a plurality of such communication conference sessions.

As described above, the communication conference sessions may be PoC sessions, but as an alternative the invention may also be used in other communication conference systems, such as, for example, in communication conference systems in accordance with the IETF conferencing framework.

The process of determining whether a communication right has been granted to a different subscriber in a second communication conference session between a second plurality of subscribers may be carried out by a communication conference session server, for example by a communication conference session server as described above.

In accordance with one embodiment of the invention, it is provided that the process of determining whether the communication right has been granted to a different subscriber in a second communication conference session between a second plurality of subscribers is carried out by a push-to-talk-over-cellular server of the subscriber participating as a subscriber in the first communication conference session and in the second communication conference session. By way of example, a participating push-to-talk-over-cellular server of the subscriber participating as subscriber in the two communication conference sessions may carry out the above-described method for determining whether a communication right has been granted to a different subscriber in a second communication conference session.

In accordance with this embodiment of the invention, the coupling function of the communication right allocation with regard to both communication conference sessions under consideration, generally any desired number of communication conference sessions which one subscriber has logged on to simultaneously, is transferred in a very simple manner into the respective participating PoC server of the subscriber since the participating PoC server of the subscriber has knowledge anyway about the corresponding communication conference sessions which the subscriber to which the participating PoC server has been assigned has logged on to.

A very simple and cost-effective coupling of the communication conference sessions with regard to the communication right allocation is thus achieved.

On account of the coupling between the communication conference sessions the invention ensures that a subscriber participating in a plurality of communication conference sessions simultaneously does not miss any message and every message, for example every voice message in the context of a plurality of PoC sessions, is given to the user.

For the case where the requested communication right is granted to the subscriber in the first communication conference session, in accordance with one embodiment of the invention it is provided that a notification, for example in the form of a corresponding notification protocol message, about the allocation of the communication right is sent to at least some of the subscribers in the second communication conference session.

In this way, not only the subscribers in the first communication conference session are informed about the communication right allocation, as is customarily provided in a current PoC communication system, but also the subscribers in the second communication conference session. User-transparent control of the communication conference sessions which are "coupled" to one another is achieved in this way.

In accordance with another embodiment of the invention, it is provided that for the case where a communication right has been granted to a subscriber in the second communication conference session, a process of determining whether the first communication conference session has been assigned a higher communication conference priority than the second communication conference session is effected. For the case where the first communication conference session has been assigned a higher communication right priority than the second communication conference session, the communication right is withdrawn from the subscriber in the second communication conference session and is granted to the subscriber in the first communication conference session. For the case where the first communication conference session has not been assigned a higher communication right priority than the second communication conference session, the subscriber in the first communication conference session is denied the requested communication right.

For the case where the subscriber in the first communication conference session is denied the requested communication right, the subscriber may be stored in a communication right allocation queue. This means that the requests regarding the communication right allocation are stored and are progressively stored in succession analogously to a first-in, first-out buffer memory, that is to say a queue. This avoids renewed requesting of the communication right if the request is initially denied.

In accordance with another embodiment of the invention it is provided that a coupling of the communication conference sessions with regard to the allocation of a communication right is requested by the subscriber in both communication conference sessions.

This explicit requesting of the coupling may be provided by means of corresponding protocol messages before the setting-up of one or more communication conference sessions or else during one or more communication conference session(s) already set up.

This enables a further intervention on the part of the user in the control of the communication conference sessions, thereby considerably increasing the operational convenience for a user and a subscriber in a communication conference session.

The communication conference sessions may be, as described above, PoC sessions or else communication conference sessions based on the IETF conferencing framework using the IMS.

Another embodiment provides for one of the two communication conference sessions to be a PoC session and the other to be a communication conference session in accordance with the IETF conferencing framework.

In the communication conference session server arrangement, the first communication conference session server may be a controlling push-to-talk-over-cellular server, as may the second communication conference session server as well, and the third communication conference session server may be a participating push-to-talk-over-cellular server.

Exemplary embodiments of the invention are illustrated in the figures and are explained in more detail below.

FIG. 1 shows a push-to-talk-over-cellular communication system 100 in accordance with the exemplary embodiments of the invention.

In accordance with FIG. 1, the PoC communication system 100 has a multiplicity of communication terminals each containing a push-to-talk-over-cellular client unit (PoC client unit).

For simplification, FIG. 1 only illustrates the respective PoC client units 101, 102, 103, 104, 105, but they are integrated in a respective PoC-enabled device, for example in a mobile radio communication terminal.

Furthermore, the communication system 100 has a PoC communication network 106, the respective units being implemented in such a way that the methods described below can be carried out.

The PoC communication network 106 has a respective controlling PoC server 107, 108 for each push-to-talk-over-cellular communication conference session (also referred to as PoC session hereinafter) set up.

Furthermore, there is provided for each PoC client unit 101, 102, 103, 104, 105 a participating PoC server A 109, B 110, C 111, D 112, E 113 respectively assigned unambiguously thereto.

Consequently, the PoC client units A 101, B 102, C 103, D 104, E 105 have an interface with their respective participating PoC server A 109, B 110, C 111, D 112, E 113, which in turn have a communication link to the respective central controlling PoC server 107, 108, for a respective PoC session.

The respective controlling PoC server 107, 108 has, inter alia, the functionality of managing the talk right allocation (also referred to as floor control). The interface between a PoC client unit A 101, B 102, C 103, D 104, E 105 and the respective participating PoC server A 109, B 110, C 111, D 112, E 113 may be effected for example via GSM (Global System for Mobile Communication), GPRS (General Packet Radio System), UMTS (Universal Mobile Telecommunications System) or else via PSTN (i.e. a fixed network).

In this example, the first PoC client unit A 101 has logged on to two PoC sessions simultaneously, that is to say that its associated first participating PoC server A 109 has set up a communication link to two different controlling PoC servers 107, 108. For the case where voice messages occur simultaneously in both PoC sessions, only one of the two voice messages can be forwarded to the first PoC client unit A 101.

It is assumed in accordance with these exemplary embodiments of the invention that the first PoC client unit A 101 has set up a first PoC session, under the control of the first controlling PoC server 107, with a second PoC client unit B 102 and also a third PoC client unit C 103.

Furthermore, the first PoC client unit A 101 has set up a second PoC session, controlled by a second controlling PoC server 108, with a fourth PoC client unit D 104 and a fifth PoC client unit E 105.

Figure 2:
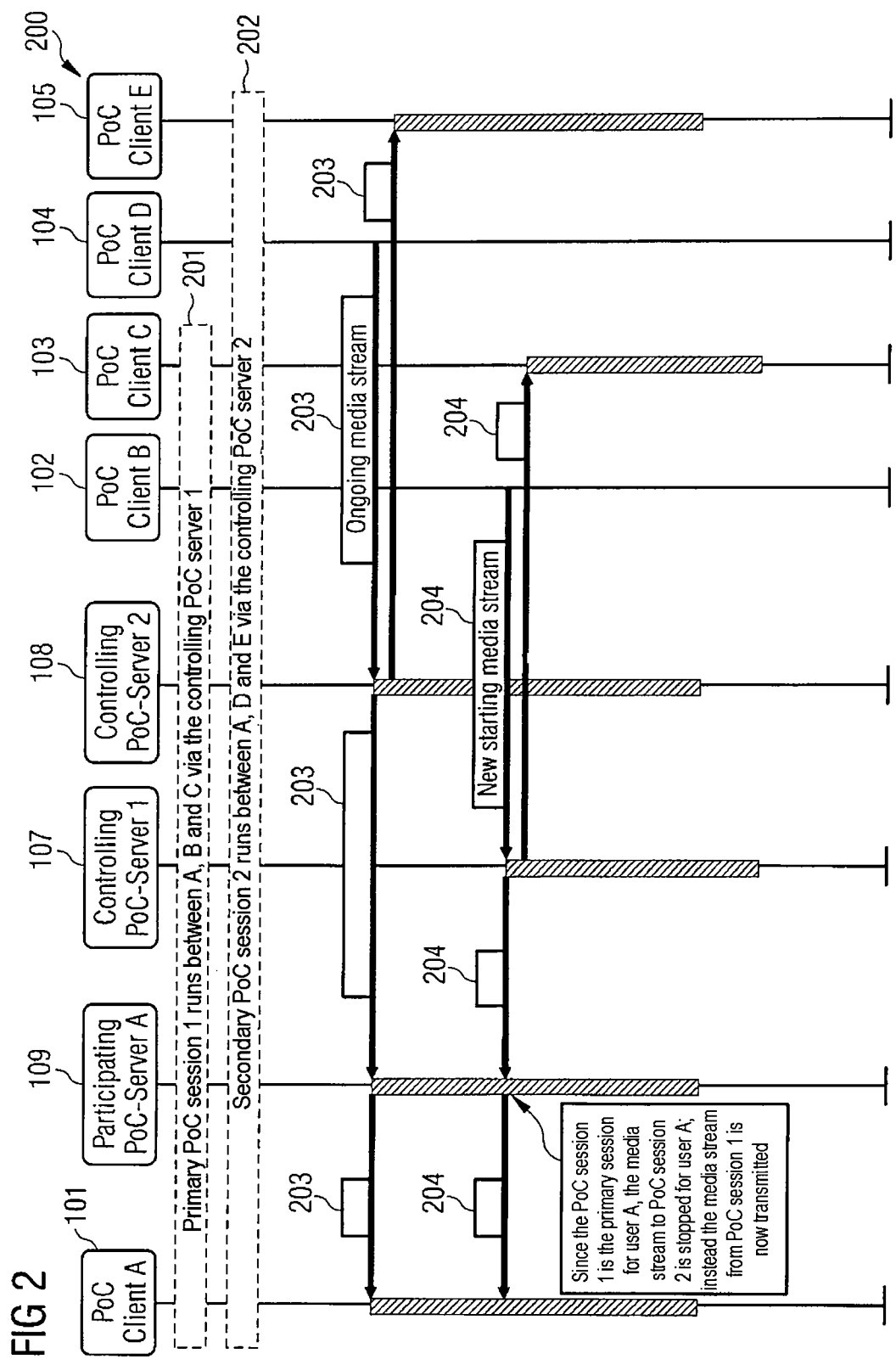
FIG. 2 shows a message flow diagram illustrating a possible message flow for a talk right allocation.

FIG. 2 shows, in a message flow diagram 200 for illustration purposes, firstly a conventional media flow for the scenario assumed above and illustrated in FIG. 1.

In this exemplary embodiment, the first PoC session is referred to as the primary PoC session (symbolized by block 201 in FIG. 2) and the second PoC session is referred to as the secondary PoC session (symbolized by block 202 in FIG. 2).

The primary PoC session 201 has a higher communication right allocation priority than the secondary PoC session 202.

It is assumed in accordance with FIG. 2 that a communication right has been allocated in the context of the secondary PoC session in such a way that the fourth PoC client unit D 104 is permitted to introduce voice messages 203 into the PoC session; to put it another way, the talk right has been granted to the fourth PoC client unit D 104.

Consequently, the fourth PoC client unit D 104 communicates voice messages 203 to the second controlling PoC server 108, which communicates the voice messages 203 to the respective participating PoC servers 109, 113 of the first PoC client unit A 101 and of the fifth PoC client unit E 105 and via them to the first PoC client unit A 101 and the fifth PoC client unit E 105.

It is further assumed in accordance with FIG. 2 that during this time during which the fourth PoC client unit D 104 has the talk right allocated, the second PoC client unit B 102 requests the talk right in the primary PoC session by means of a corresponding request message 204, which it communicates to the first controlling PoC server 107. The first controlling PoC server 107 grants the talk right to the second PoC client unit B 102, whereupon the latter communicates voice messages 204 to the first controlling PoC server 107. The first controlling PoC server 107 forwards the voice messages 203 to the first participating PoC server A 109 of the first PoC client unit A 101 and also to the third participating PoC server C 111 of the third PoC client unit C 103. The third participating PoC server C 111 of the third PoC client unit C 103 forwards the respective voice message 204 to the third PoC client unit C 103. The first participating PoC server A 109, upon receiving the voice message from the first controlling PoC server 107, recognizes that transmission of voice messages is still proceeding in the context of the secondary PoC session 202, and it furthermore recognizes that the primary PoC session has higher priority for the first PoC client unit A 101. For this reason, the media data stream and thus the transmission of the voice message 203 from the first participating PoC server A 109 of the first PoC client unit 101 is stopped and instead the media data stream from the primary PoC session 201 and thus the voice message 204 is transmitted from the first participating PoC server A 109 to the first PoC client unit 101.

As has been described above, the media data stream and thus the voice messages from the secondary PoC session 202 are thus lost to the first PoC client unit 101.

It should be pointed out in this connection that any desired type of data streams, that is to say multimedia data streams, can be transmitted and can be treated in accordance with a method described below. Consequently, audio data, video data, still image data, textual data, etc. can be transmitted in the context of the invention and in the context of the communication conference sessions.

One case of application for the message flow described in FIG. 2 and for the subsequent message flows described is the utilization of the exemplary embodiments of the invention by a construction company manager responsible for a plurality of construction sites. The construction company manager has logged on to two PoC sessions running simultaneously and is thus the user of, for example, the first PoC client unit A 101. A first PoC session may be a PoC session with all the workers on the first construction site (for example users of the second PoC client unit B 102 and of the third PoC client unit C 103) and the second PoC session may be a PoC session on a second construction site (the workers being for example users of the fourth PoC client unit D 104 and of the fifth PoC client unit E 105). Since both construction sites are under time pressure and the optimum organization of the workers is very important, it would be very undesirable if the construction company manager missed any voice message of the PoC sessions.

As is illustrated in FIG. 1, the participating PoC server 109 assigned to the first PoC client unit A 101 is a network element which is involved in both PoC sessions. Therefore, the participating PoC server 109 of the first PoC client unit A 101 is a suitable entity in which it is possible to provide the monitoring regarding the coupling of the talk right allocation in the context of the PoC sessions. In accordance with the subsequent exemplary embodiments it is provided that the first participating PoC server A 109 of the first PoC client unit A 101 manages the status as to whether currently in one of the two PoC sessions the talk right has already been allocated or not (also referred to hereinafter as "talk right allocation blocked" 310).

It should be pointed out in this connection that, in alternative embodiments of the invention, a separate unit may also be provided for monitoring regarding the coupling of the talk right allocation described below and thus of the PoC sessions, generally the communication right allocation. In the case of a communication conference system based on a different architecture, for example with only one conference server, as provided in the IETF conferencing framework, the monitoring regarding the communication right allocation may also be provided in the central communication conference server.

Figure 3:
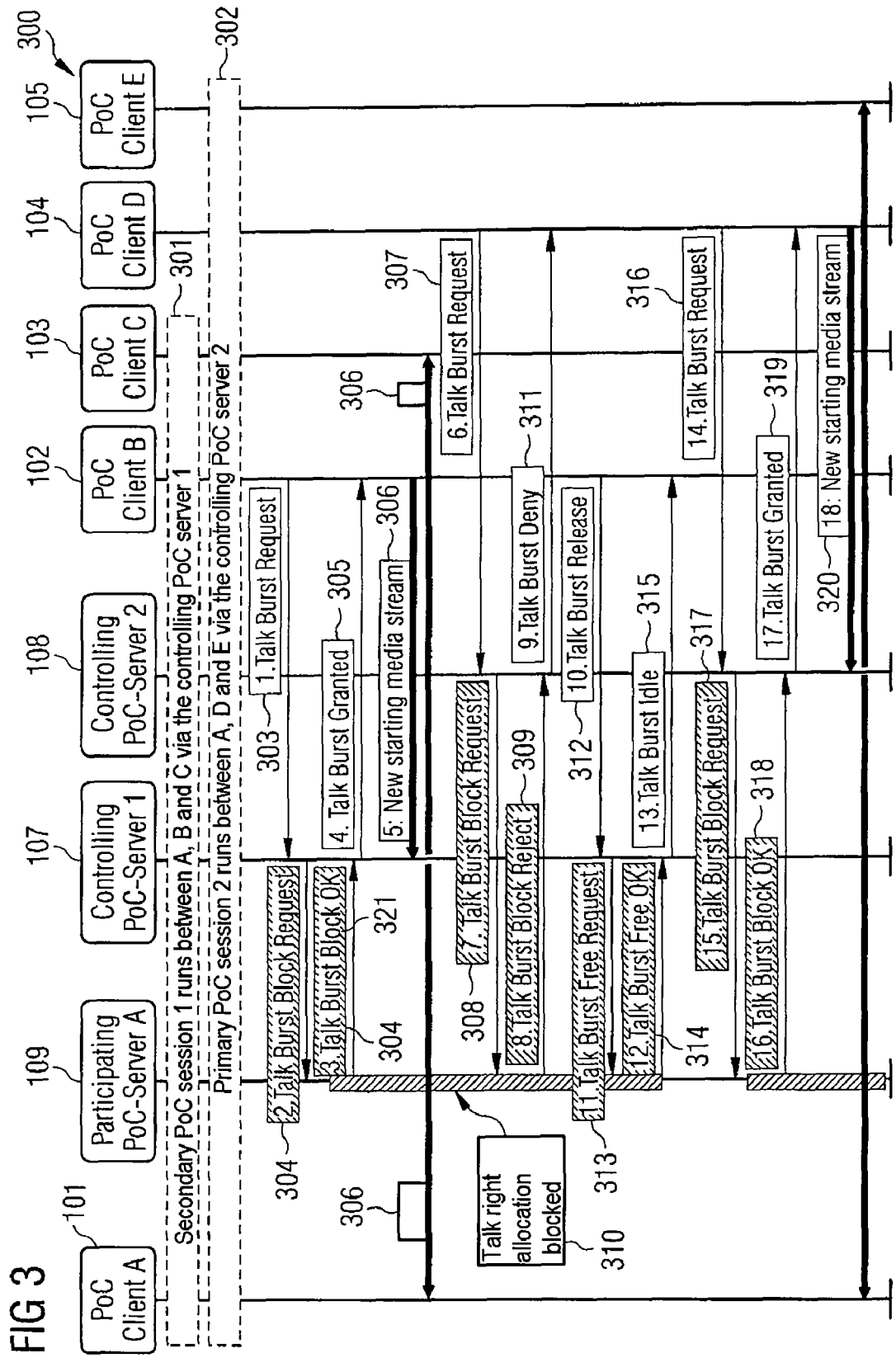
FIG. 3 shows a message flow diagram illustrating the individual messages in the context of a communication right allocation in accordance with a first exemplary embodiment of the invention.

FIG. 3 shows, in a message flow diagram 300, the message flow in accordance with a first exemplary embodiment of the invention.

It is assumed that a first PoC session controlled by the first controlling PoC server 107 is set up between the first PoC client unit A 101, the second PoC client unit B 102 and the third PoC client unit C 103, but said first PoC session is in this case a secondary PoC session (symbolized by block 301 in FIG. 3). A second PoC session controlled by the second controlling PoC server 108, a primary PoC session (symbolized by block 302 in FIG. 3) in accordance with this exemplary embodiment of the invention, proceeds between the first PoC client unit A 101, the fourth PoC client unit D 104 and the fifth PoC client unit E 105.

In accordance with this exemplary embodiment of the invention, it is assumed that the user B, that is to say the user of the second PoC client unit B 102, would like to talk in the first PoC session. The second PoC client unit B 102 thus sends a "Talk_Burst_Request" message 303 to the first controlling PoC server 107 via its second participating PoC server B 110 (cf. FIG. 1).

It is pointed out that in the message flow diagrams described below, the respective participating PoC server of the second PoC client unit B 102, of the third PoC client unit C 103, of the fourth PoC client unit D 104, and of the fifth PoC client unit E 105, are not illustrated for reasons of simplifying the illustration in the message flow diagrams 300, 400, 500, 600. It should be noted, however, that the message flow runs in each case via the respective participating PoC servers 110, 111, 112, 113.

Upon receiving the "Talk_Burst_Request" message 303, the first controlling PoC server 107 uses a "Talk_Burst_Block_Request" message 304 to inquire of the first participating PoC server A 109 whether the talk right allocation is currently blocked, or to put it another way has been otherwise allocated, and, if this is not the case, the controlling PoC server 107 asks the first participating PoC server A 109 to do this for it.

Since it is assumed in this exemplary embodiment of the invention that the talk right allocation is not yet blocked at present, the first participating PoC server A 109 of the first PoC client unit A 101 answers the inquiry by means of the "Talk_Burst_Block_Request" message 304 positively by means of a "Talk_Burst_Block_OK" message 321, which the first participating PoC server A 109 communicates to the first controlling PoC server 107. Furthermore, the first participating PoC server A 109 sets the status of the talk right allocation to "talk right allocation blocked".

Upon receiving the "Talk_Burst_Block_OK" message 321, the first controlling PoC server 107 generates a "Talk_Burst_Granted" message 305 and communicates the latter to the second PoC client unit B 102, whereby the first controlling PoC server 107 informs the second PoC client unit B 102 that it has been granted the talk right.

Upon receiving the "Talk_Burst_Granted" message 305, the second PoC client unit B 102 starts sending the voice message(s) 306 in the first PoC session. The voice message(s) 306 is (are) sent to the first controlling PoC server 107 and sent on from the latter to the further subscribers in the first PoC session, namely to the first PoC client unit A 101 and the third PoC client unit C 103.

It is furthermore assumed in this exemplary embodiment that the PoC user D, that is to say the user of the fourth PoC client unit D 104, would now like to talk in the second PoC session.

For this reason, the fourth PoC client unit D 104 sends a "Talk_Burst_Request" message 307 to the second controlling PoC server 108, likewise via its fourth participating PoC server D 112. The second controlling PoC server 108 likewise uses a "Talk_Burst_Block_Request" message 308 to inquire of the participating PoC server A 109 of the first PoC client unit A 101 whether the talk right allocation is currently blocked and, if not, whether the first participating PoC server A 109 would do this for the second controlling PoC server 108. Since, in this case, the talk right allocation, generally the communication right, is, however, already blocked (for the second PoC client unit B 102), the first participating PoC server A 108 answers the request message 308 negatively with a "Talk_Burst_Block_Reject" message 309. The blocked status of the talk right allocation is symbolized by block 310 in FIG. 3. Upon receiving the "Talk_Burst_Block_Reject" message 309, the second controlling PoC server 308 generates a "Talk_Burst_Deny" message 311 and sends the latter to the fourth PoC client unit D 104, whereby the second controlling PoC server 108 informs the fourth PoC client unit D 104 that the latter has been denied the talk right. Therefore, the fourth PoC client unit D 104 does not, moreover, send a voice message.

It is furthermore assumed that afterward the second PoC client unit B 102 ends the sending of the voice message 306 and releases the talk right to the first controlling PoC server 107 by means of a "Talk_Burst_Release" message 312 generated by the second PoC client unit B 102 and communicated to the first controlling PoC server 107.

Upon receiving the "Talk_Burst_Release" message 312, the first controlling PoC server 107 uses a "Talk_Burst_Free-Request" message 313 to notify the participating PoC server A 109 that the latter can cancel the blocking of the talk right, which the first participating PoC server A 109 does upon receiving the "Talk_Burst_Free-Request" message 313 and confirms by means of a "Talk_Burst_Free_OK" message 314 generated by said server and communicated to the first controlling PoC server 107.

The first participating PoC server A 109 thereupon cancels the blocking, as described above. The first controlling PoC server 107 in turn confirms the release to the second PoC client unit B 102 by means of a "Talk_Burst_Idle" message 315 generated by the first controlling PoC server 107 and communicated to the second PoC client unit B 102.

The fourth PoC client unit D 104 then once again attempts to receive the talk right in the second PoC session by means of generating and communicating a "Talk_Burst_Request" message 316 to the second controlling PoC server 108. The second controlling PoC server 108, upon receiving the "Talk_Burst_Request" message 316, in turn inquires of the first participating PoC server A 109 whether the talk right allocation is currently blocked and, if this is not the case, whether it would do this for it.

This is once again effected by means of a "Talk_Burst_Block_Request" message 317 generated by the second controlling PoC server 108 and communicated to the participating PoC server 109.

The first participating PoC server A 109 checks this upon receiving the "Talk_Burst_Block_Request" message 317 and, since the talk right allocation is not blocked in this case, the first participating PoC server A 109, in response to the inquiry, answers positively by means of a "Talk_Burst_Block_OK" message 318 generated by said server and communicated to the second controlling PoC server 108.

Upon receiving the "Talk_Burst_Block_OK" message 318, the second controlling PoC server 108 generates a "Talk-Burst-Granted" message 319 and sends the latter to the fourth PoC client unit D 104, whereby the second controlling PoC server 108 informs the fourth PoC client unit D 104 that the latter has been granted the talk right.

Upon receiving the "Talk_Burst_Granted" message 319, the fourth PoC client unit D 104 starts sending a voice message 320 in the second PoC session to the second controlling PoC server 108, which forwards the voice message 320 to the further subscribers in the PoC session, in this case to the first PoC client unit A 101 and the fifth PoC client unit E 105, once again directed via the respective participating PoC servers 109, 113.

It should be noted in this connection that provision is made, as required, for transferring, or to put it another way realizing, even further functionalities of floor control, generally the management of the PoC sessions, in the respective participating PoC server of the PoC client unit participating in a plurality of PoC sessions.

Consequently, in the case of the embodiments described, the respective controlling PoC server inquires of the participating PoC servers associated with a PoC client unit participating in more than one PoC session whether the talk right allocation is blocked, before the controlling PoC server allocates a talk right in its PoC session which it controls.

Figure 4:
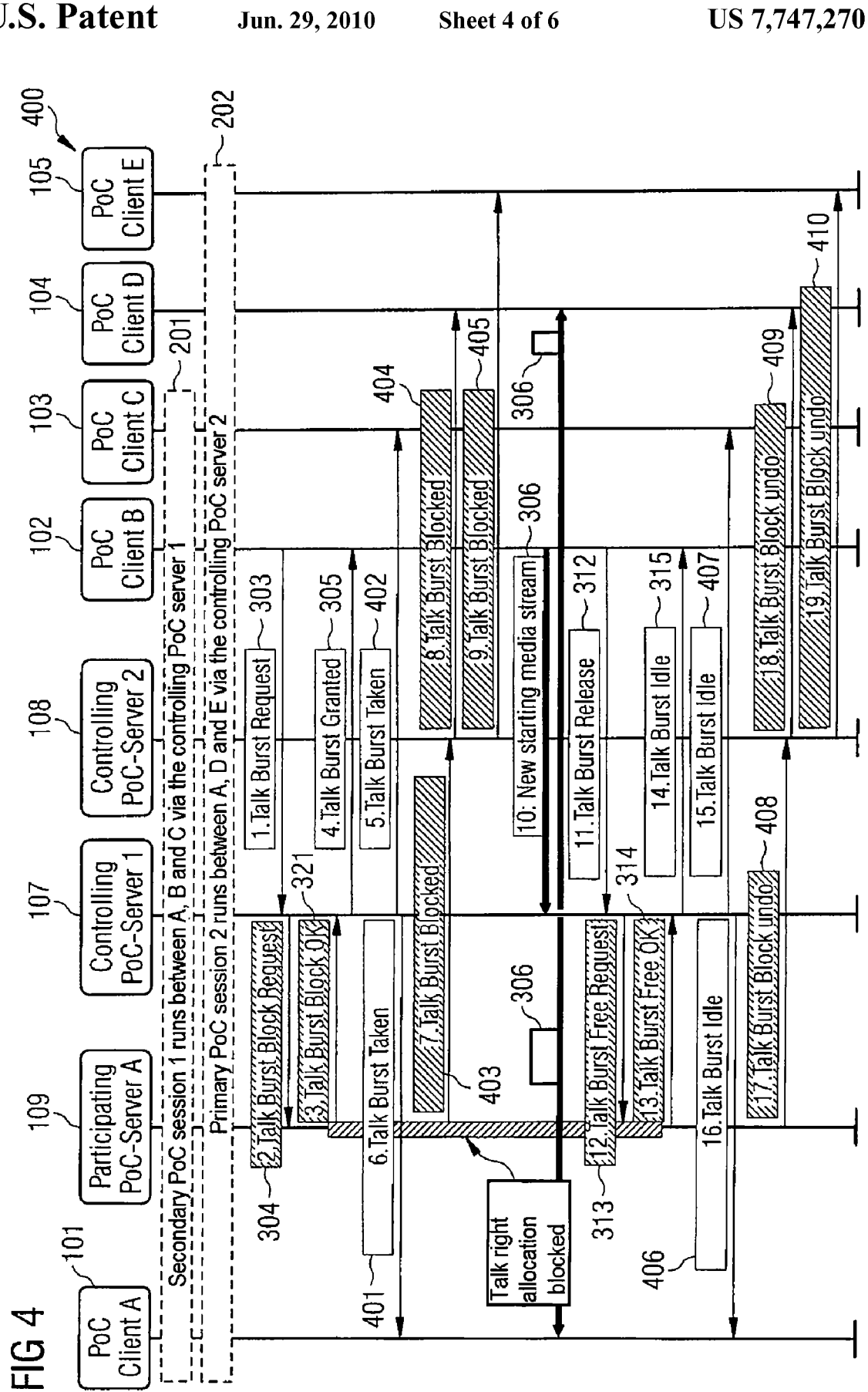
FIG. 4 shows a message flow diagram illustrating the individual messages in the context of a communication right allocation in accordance with a second exemplary embodiment of the invention.

FIG. 4 shows, in a message flow diagram 400, the message flow in accordance with a second exemplary embodiment of the invention.

The first exemplary embodiment of the invention provided for the fourth PoC client unit D 104 to attempt "trusting to luck" to receive the talk right within the second PoC session (cf. "Talk_Burst_Request" messages 307, 316 in FIG. 3), whereupon the second controlling PoC server 108 likewise had to inquire of the first participating PoC server A 109 (represented in FIG. 3 by means of the "Talk_Burst_Block_Request" messages 308, 317).

What is achieved in accordance with the second exemplary embodiment of the invention is that both the second controlling PoC server 108 and, if appropriate, the subscribers in the second PoC session, namely the first PoC client unit A 101, the fourth PoC client unit D 104 and the fifth PoC client unit E 105, know at any time if the status of the talk right allocation for the PoC sessions that are coupled to one another is set to "talk right allocation blocked".

In order to achieve this, the following message flow is provided in accordance with the second exemplary embodiment of the invention.

In accordance with the second exemplary embodiment of the invention, the same initial scenario as in accordance with the first exemplary embodiment of the invention is assumed and the first four transmitted messages of the message flow are also identical to the messages in the first exemplary embodiment.

Thus, in accordance with the second exemplary embodiment of the invention, a "Talk_Burst_Request" message 303 is likewise communicated from the second PoC client unit B 102 to the first controlling PoC server 107, which, upon receiving said message, generates a "Talk_Burst_Block_Request" message 304 and communicates it to the first participating PoC server A 109. The first participating PoC server A 109 sets the status of the talk right allocation to blocked and confirms this to the first controlling PoC server 107 by means of the "Talk_Burst_Block_OK" message 321. The first controlling PoC server 107 releases the talk right of the second PoC client unit B 102 by means of the "Talk_Burst_Granted" message 305.

In addition to the option—provided in a customary PoC session—of notifying all PoC client units involved in the first PoC session about the talk right allocation, if a respective talk right was allocated, which is illustrated in FIG. 4 by means of "Talk_Burst_Taken" messages 401, 402 generated by the first controlling PoC server 107 and communicated to the first PoC client unit A 109 and to the third PoC client unit C 103, in accordance with this exemplary embodiment of the invention a "Talk_Burst_Blocked" message 403 is generated by the first participating PoC server A 109 and communicated to the second controlling PoC server 108, the "Talk_Burst_Blocked" message 403 informing the second controlling PoC server 108 about the fact that the talk right allocation is blocked. The second controlling PoC server 108 informs the further subscribers in the second PoC session, namely the fourth PoC client unit D 104 and the fifth PoC client unit E 105, by means of a respective "Talk_Burst_Blocked" message 404, 405 generated by the second controlling PoC server 108 and communicated to the respective client units 104, 105.

In this way, the subscribers in the second PoC session which are not subscribers in the first PoC session are also informed about the talk right allocation.

It should be pointed out in this connection that, in an alternative embodiment, the "Talk_Burst_Blocked" message 403 is not generated by the first participating PoC server A 109 and communicated to the second controlling PoC server 108, rather the first controlling PoC server 107 generates said message and communicates it to the second controlling PoC server 108.

The second PoC client unit B 102 then sends the voice message 306 to the first controlling PoC server 107, which forwards the voice message 306 to the subscribers in the first PoC session, namely to the first PoC client unit A 101 and to the third PoC client unit C 103.

After the second PoC client unit B 102 releases the talk right by means of a "Talk_Burst_Release" message 312 generated by said unit and communicated to the first controlling PoC server 107, whereupon the first controlling PoC server 107 requests the release of the talk right allocation status at the participating PoC server 109 by means of a "Talk_Burst_Free-Request" message 313, the first participating PoC server A 109 releases the status of the talk right allocation and confirms this to the first controlling PoC server 107 by means of a "Talk_Burst_Free_OK" message 314. The release of the talk right is notified on the part of the first controlling PoC server 107 to the second PoC client unit B 102 by means of a "Talk_Burst_Idle" message 315.

Furthermore, the first controlling PoC server 107 communicates the messages for information about the release of the talk right, namely the "Talk_Burst_Idle" messages 406, 407, to the subscribers in the first PoC session, namely to the first PoC client unit A 109 and to the third PoC client unit C 103.

In this case, too, the second controlling PoC server 108 is informed about the canceling of the blocking of the talk right allocation by means of a "Talk_Burst_Block_Undo" message 408 generated by the first participating PoC server A 109 or the first controlling PoC server 107 and communicated to the second controlling PoC server 108. The second controlling PoC server 108 generates corresponding "Talk_Burst_Block_Undo" messages 409, 410 and communicates them to the further subscribers in the second PoC session, namely to the fourth PoC client unit D 104 and to the fifth PoC client unit E 105.

Thus, once again the subscribers in the second PoC session which are not subscribers in the first PoC session are informed about the release of the talk right.

Figure 5:
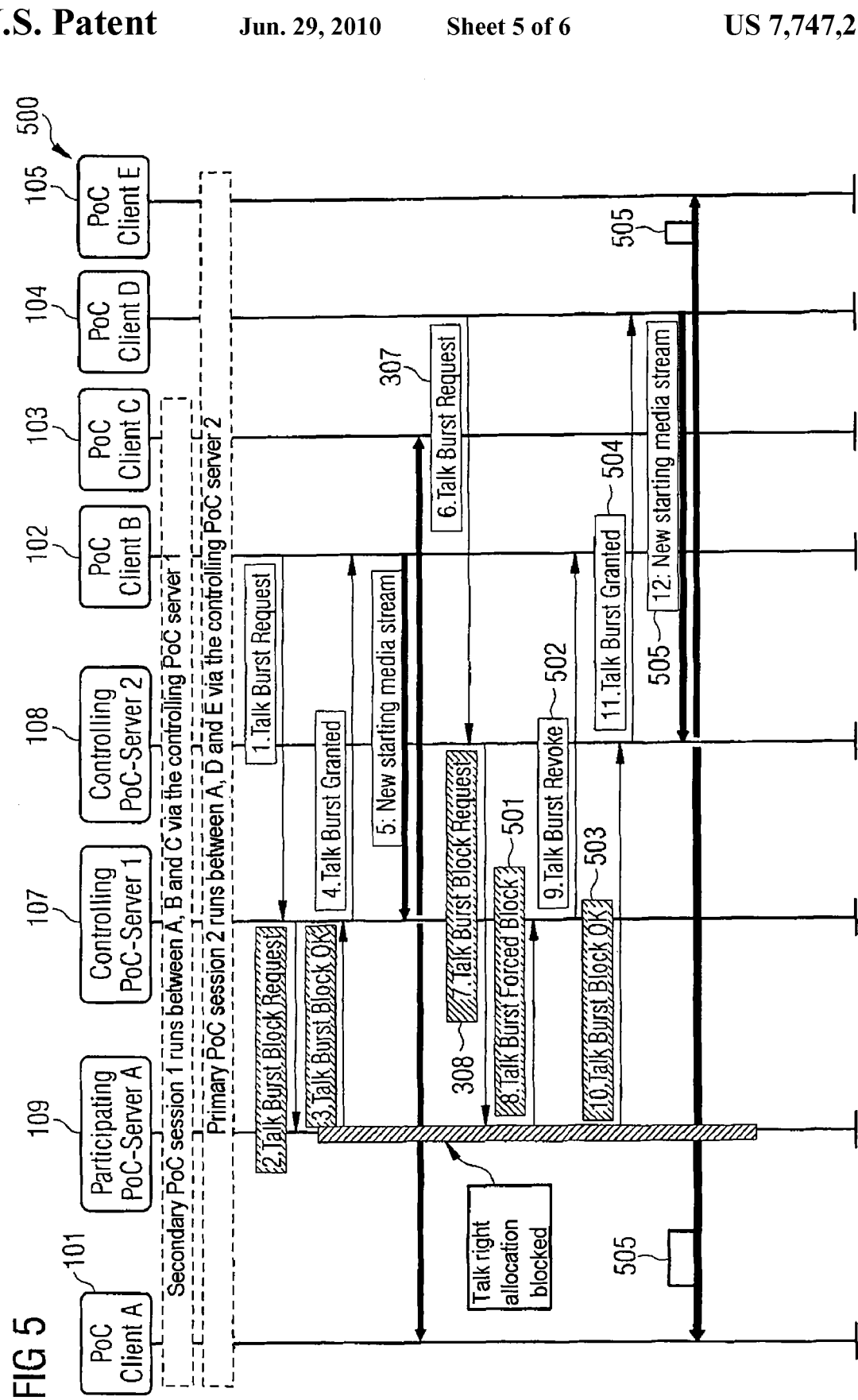
FIG. 5 shows a message flow diagram illustrating the individual messages in the context of a communication right allocation in accordance with a third exemplary embodiment of the invention.

In accordance with another embodiment of the invention, which is illustrated as an extension for the first exemplary embodiment—described in FIG. 3—in a message flow diagram 500 in FIG. 5, but may alternatively be provided as an extension in the second exemplary embodiment of the invention, too, what is taken as a basis is once again the same initial scenario as was described in connection with the first exemplary embodiment of the invention in FIG. 3.

The message flow for blocking the talk right allocation of the first PoC session is identical to the first exemplary embodiment and its explanation will not be repeated.

Once again the fourth PoC client unit D 104 requests the talk right by means of a "Talk_Burst_Request" message 307 at the second controlling PoC server 108 and the second controlling PoC server 108 uses a "Talk_Burst_Block_Request" message 308 to inquire about the talk right allocation status at the first participating PoC server 109. With this exemplary embodiment of the invention, in the first participating PoC server A 109, a conference session priority assigned to a respective PoC session is taken into account in the context of the talk right allocation.

Since, as was described in the context of the first exemplary embodiment, the first PoC session is a secondary PoC session and thus a PoC session subordinate to the second PoC session (a primary PoC session), the first participating PoC server A 109, upon receiving the "Talk_Burst_Block_Request" message 308 from the second controlling PoC server 108, withdraws the talk right from the first PoC session, more precisely the second PoC client unit B 102, and instead allocates it to the fourth PoC client unit D 104 requesting said talk right as a subscriber in the second PoC session.

The first participating PoC server A 109 communicates this to the first controlling PoC server 107 by means of a "Talk_Burst_Forced_Block" message 501. Illustratively, the first participating PoC server A 109 uses the "Talk_Burst Forced_Block" message 501 to inform the first controlling PoC server 107 about the fact that its talk right is blocked on account of a PoC session having a higher priority and a talk right request received therefrom. Upon receiving the "Talk_Burst_Forced_Block" message 501, the first controlling PoC server 107 generates a "Talk_Burst_Revoke" message 502 and communicates the latter to the second PoC client unit B 102. With this message, the first controlling PoC server 107 withdraws the talk right from the second PoC client unit B 102 in the first PoC session.

Furthermore, the first participating PoC server A 109 answers the second controlling PoC server 108, in response to the talk right request, positively by means of a "Talk_Burst_Block_OK" message 503 and furthermore keeps the status of the talk right allocation at "talk right allocation blocked".

The second controlling PoC server 108 generates a "Talk_Burst_Granted" message 504 and sends the latter to the fourth PoC client unit D 104, whereby the second controlling PoC server 108 allocates to the fourth PoC client unit D 104 the talk right in the second PoC session, whereupon the fourth PoC client unit D 104 generates a voice message 505 and sends it to the second controlling PoC server 108, which, for its part, communicates the voice message 505 to the subscribers in the second PoC session, namely to the first PoC client unit A 101 and to the fifth PoC client unit E 105.

In a further alternative embodiment of the invention, provision is made for providing a queue within a PoC session as part of the communication link control (also referred to as floor control) in the respective controlling PoC server. To put it another way, this means that if someone requests the talk right and the talk right has already been allocated to a different subscriber in the PoC session in the current time period, then the request is not finally rejected, rather the talk right is only denied temporarily and the request is stored in a queue, or to put it another way lined up in a queue. As soon as the current owner of the talk right releases this right again, the subscriber that generated the request stored next in the queue is allocated the talk right. In connection with the embodiments described, it is provided that the various queues that there may be in a plurality of PoC sessions are no longer managed separately from one another in the respective controlling PoC server, but rather in a participating PoC server, by way of example. The queues are combined and managed centrally by the first participating PoC server A 109.

Consequently, there are no longer any queues kept in the controlling PoC servers 107, 108, instead a common queue is held in the first participating PoC server A 109. Each request that arrives at a controlling PoC server 107, 108 with regard to the talk right is forwarded to the first participating PoC server A 109 (for example by means of the message "Talk_Burst_Block_Request" described above). In the case where the talk right is currently already blocked, instead of answering with a "Talk_Burst_Block_Reject", the first participating PoC server A 109 can also answer with a message by which it signals that the request has been included in the talk right allocation queue. Optionally, the queue position of the request may also be signaled in the message. As soon as the talk right becomes free again in such a case, the next subscriber in the queue receives the talk right and is notified accordingly.

Before applying a coupling of the talk right allocation between the two PoC sessions, this should be initiated by someone.

Figure 6:
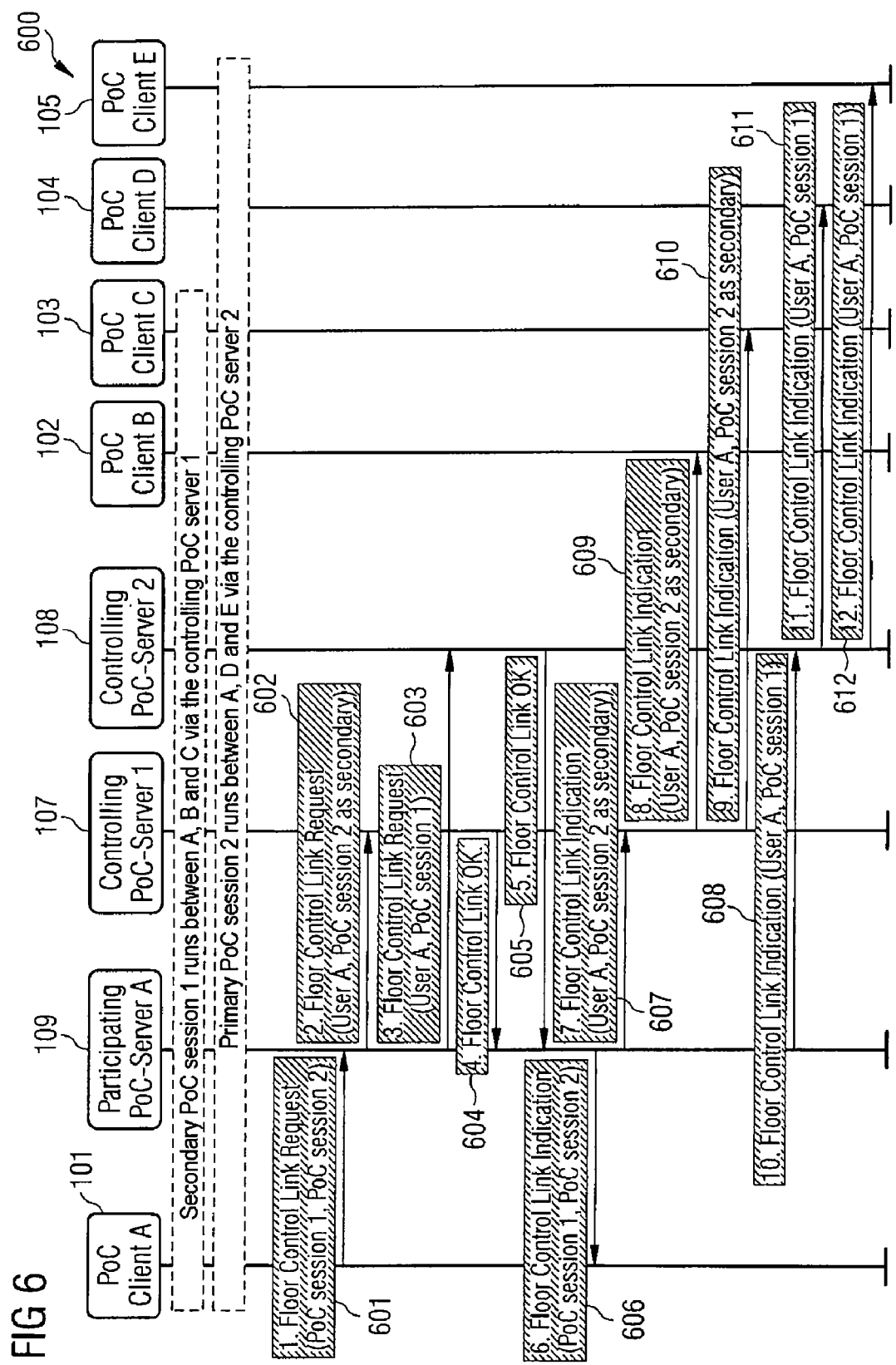
FIG. 6 shows a message flow diagram illustrating the individual messages in the context of a communication right allocation in accordance with a fourth exemplary embodiment of the invention.

For this purpose, as illustrated in a message flow diagram 600 in FIG. 6, it is provided that this is requested by the first PoC client unit 101 at its first participating PoC server A 109 by means of a "Floor_Control_Link_Request" message 601, which should contain as a parameter the indication of the PoC sessions to be coupled to one another, in which case the PoC sessions may be identified by means of an unambiguous SIP address (SIP: Session Initiation Protocol), by way of example.

Upon receiving the "Floor_Control_Link_Request" message 601, the participating PoC server 109 generates two "Floor_Control_Link_Request" messages 602, 603 and sends one of said messages 602, 603 respectively to the first controlling PoC server 107 and to the second controlling PoC server 108. The "Floor_Control_Link_Request" messages 602, 603 contain as parameters the indication of the PoC client unit requesting the coupling of the PoC sessions and also the indication of the PoC sessions which are to be coupled to one another and also, if appropriate, the priorities thereof.

The first participating PoC server A 109 thus inquires of the responsible controlling PoC servers 107, 108 whether, on the one hand, the performance feature of the coupling of PoC sessions is supported at all and, on the other hand, whether the PoC user A, that is to say the user of the first PoC client unit A 101, within the corresponding PoC session has the right to couple talk right allocations to one another. For this purpose, a method which can allocate such a right to the subscribers in a PoC session is furthermore provided within the respective PoC session. If, at a controlling PoC server 107, 108, both checks of both the above questions formulated as explained above are implemented with a positive result, then the controlling PoC server 107, 108 answers in each case with a positive confirmation message, designated in FIG. 6 as "Floor_Control_Link_OK" messages 604, 605, which the respective controlling PoC server 107, 108 communicates to the first participating PoC server A 109.

After the first participating PoC server A 109 has received a positive confirmation from all the controlling PoC servers 107, 108 involved, the coupling of the talk right allocation between the PoC sessions involved is established.

The first participating PoC server A 109 informs both the requesting PoC user A, that is to say the first PoC client unit A 101 thereof, and in each case the controlling PoC servers 107, 108 involved about this decision by means of respective "Floor_Control_Link_Indication" messages 606, 607, 608. For their part, the controlling PoC servers 107, 108 inform the respective further subscribers logged on to the PoC session controlled thereby by means of corresponding "Floor_Control_Link_Indication" messages 609, 610, 611, 612.

To summarize, an embodiment of the invention has the following features:
Initiation of the talk right allocations between a plurality of PoC sessions;
user requests the initiation of the talk right allocations at its participating PoC server;
the participating PoC server of the PoC user requests the initiation of the talk right allocations at all the controlling PoC servers involved;
notification of all PoC users about the coupling of the PoC sessions;
signaling for example using messages in accordance with the session initiation protocol (SIP).
Control of the coupling by the participating PoC server;

all the controlling PoC servers involved will "forward" requests for talk right allocations to the participating PoC server;

the participating PoC server centrally manages the status of whether the talk right allocation is currently blocked;

the participating PoC server permits the allocation of the talk right if the status of the talk right is "blocked";

corresponding signaling as an extension of a floor control protocol, such as, for example, a specified RTCP protocol extension (Real Time Transport Control Protocol) or Binary Floor Control Protocol (BFCP);

Notification of all the PoC users involved about the "block status" by the participating PoC server with the aid of the controlling PoC servers involved;

corresponding signaling as an extension of a floor control protocol such as, for example, RTCP extension or BFCP extension;

Taking account of the priority selection by the initiating PoC user with regard to the PoC sessions involved, for example a "primary group" always having privileged priority over "secondary groups".

The invention claimed is:

1. A method for allocating a communication right in a first communication conference session between a first plurality of subscribers, comprising:
   determining, after a communication right has been requested by a first subscriber in the first communication conference session, whether a communication right has been granted to a different subscriber in a second communication conference session between a second plurality of subscribers, at least one second subscriber of the first plurality of subscribers in the first communication conference session also being a subscriber in the second communication conference session, the at least one second subscriber participating in the first communication conference session and in the second communication conference session by means of a subscriber server assigned to the at least one second subscriber, and a process of determining whether a communication right has been granted to a different subscriber in the second communication conference session being carried out by the subscriber server assigned to the at least one second subscriber;
   denying the first subscriber the requested communication right when a communication right has been granted to a subscriber in the second communication conference session; and
   granting the first subscriber the requested communication right when a communication right has not been granted to any subscriber in the second communication conference session.

2. The method as claimed in claim 1, wherein the first communication conference session or the second communication conference session is a half-duplex communication conference session.

3. The method as claimed in claim 1, wherein the first communication conference session and the second communication conference session are half-duplex communication conference sessions.

4. The method as claimed in claim 1, wherein the first communication conference session or the second communication conference session is a push-to-talk communication conference session.

5. The method as claimed in claim 1, wherein the first communication conference session and the second communication conference session are push-to-talk communication conference sessions.

6. The method as claimed in claim 1, wherein the first communication conference session or the second communication conference session is a push-to-talk-over-cellular communication conference session.

7. The method as claimed in claim 1, wherein the first communication conference session and the second communication conference session are push-to-talk-over-cellular communication conference sessions.

8. The method as claimed in claim 1, further comprising, when the requested communication right is granted to the first subscriber in the first communication conference session, sending a notification of the granting of the communication right to at least one of the second plurality of subscribers in the second communication conference session.

9. The method as claimed in claim 1, further comprising
   when a communication right has been granted to a subscriber in the second communication conference session, determining whether the first communication conference session has been assigned a higher communication right priority than the second communication conference session; and
   when the first communication conference session has been assigned a higher communication right priority than the second communication conference session, withdrawing the communication right from the subscriber in the second communication conference session and granting the communication right to the subscriber in the first communication conference session; and
   when the first communication conference session has not been assigned a higher communication right priority than the second communication conference session, denying the subscriber in the first communication conference session the requested communication right.

10. The method as claimed in claim 1, further comprising, when the subscriber in the first communication conference session is denied the requested communication right, storing the subscriber in a communication right allocation queue.

11. The method as claimed in claim 1, further comprising requesting a coupling of the communication conference sessions with regard to the allocation of a communication right by the at least one second subscriber in both communication conference sessions.

12. The method as claimed in claim 1, wherein each of the first communication conference session and the second communication conference session is an Internet multimedia subsystem communication conference session.

13. A communication conference session server for providing a first communication conference session between a first plurality of subscribers and a second communication conference session between a second plurality of subscribers, at least one subscriber of the first plurality of subscribers in the first communication conference session also being a subscriber in the second communication conference session and participating in the first communication conference session and in the second communication conference session by means of a subscriber server assigned to the at least one subscriber, comprising:
   a communication right allocation unit allocating a communication right, which grants a subscriber in a communication conference session a right to introduce communication data into the communication conference session; and a communication right determining unit that, after receiving a request from a subscriber in the first communication conference session for granting a communication right, requests the subscriber server to determine whether a communication right has been granted to a different subscriber in the second communication conference session,
- when a communication right has been granted to a subscriber in the second communication conference session, denying the subscriber in the first communication conference session the requested communication right, and
- when a communication right has not been granted to any subscriber in the second communication conference session, granting the subscriber in the first communication conference session the requested communication right.

14. The communication conference session server as claimed in claim 13, wherein the communication conference session server is a push-to-talk server.

15. The communication conference session server as claimed in claim 14, wherein the communication conference session server is a push-to-talk-over-cellular server.

16. A communication conference session server arrangement, comprising:
- a first communication conference session server, providing and controlling a first communication conference session between a first plurality of subscribers;
- a second communication conference session server, providing and controlling a second communication conference session between a second plurality of subscribers, at least one subscriber of the plurality of subscribers in the first communication conference session also being a subscriber in the second communication conference session; and
- a subscriber server, being coupled to the first communication conference session server and to the second communication conference session server and by means of which the subscriber participates in the first communication conference session and in the second communication conference session,
- wherein the first communication conference session server, upon receiving a request from a subscriber in the first communication conference session for granting a communication right, forwarding the request to the subscriber server and granting the communication right to the subscriber only if the first communication conference session server receives a corresponding release by the subscriber server.

17. The communication conference session server arrangement as claimed in claim 16, wherein the first communication conference session server and the second communication conference session server control push-to-talk-over-cellular servers, and the subscriber server is a participating push-to-talk-over-cellular server.

18. A communication conference session server arrangement, comprising:
- a first communication conference session serving means for providing and controlling a first communication conference session between a first plurality of subscribers;
- a second communication conference session serving means for providing and controlling a second communication conference session between a second plurality of subscribers, at least one subscriber of the plurality of subscribers in the first communication conference session also being a subscriber in the second communication conference session; and
- a subscriber serving means, coupled to the first communication conference session server and to the second communication conference session server, for allowing the subscriber to participates in the first communication conference session and in the second communication conference session,
- wherein the first communication conference session serving means, upon receiving a request from a subscriber in the first communication conference session for granting a communication right, is also for forwarding the request to the subscriber serving means and granting the communication right to the subscriber only if the first communication conference session serving means receives a corresponding release by the subscriber serving means.

* * * * *